(12) United States Patent
Kuris et al.

(10) Patent No.: US 12,411,683 B2
(45) Date of Patent: Sep. 9, 2025

(54) PATCH SHARING MECHANISM IN OPEN-SOURCE ENVIRONMENTS

(71) Applicant: RED HAT, INC., Raleigh, NC (US)

(72) Inventors: Eran Kuris, Holon (IL); Avraham Talmor, Rishon Lezion (IL)

(73) Assignee: Red Hat, Inc., Raleigh, NC (US)

( * ) Notice: Subject to any disclaimer, the term of this patent is extended or adjusted under 35 U.S.C. 154(b) by 179 days.

(21) Appl. No.: 18/124,033

(22) Filed: Mar. 21, 2023

(65) Prior Publication Data

US 2024/0319989 A1    Sep. 26, 2024

(51) Int. Cl.
 *G06F 8/71* (2018.01)
 *G06F 21/62* (2013.01)

(52) U.S. Cl.
 CPC ............ *G06F 8/71* (2013.01); *G06F 21/6218* (2013.01)

(58) Field of Classification Search
 CPC .............................. G06F 8/71; G06F 21/6218
 See application file for complete search history.

(56) References Cited

U.S. PATENT DOCUMENTS

| | | | |
|---|---|---|---|
| 8,645,341 B2 | 2/2014 | Salman et al. | |
| 10,114,637 B1 | 10/2018 | Wilson et al. | |
| 11,232,097 B1 | 1/2022 | Antao | |
| 11,275,659 B2 | 3/2022 | Kolesnik et al. | |
| 2006/0136904 A1* | 6/2006 | Weidman | G06F 8/71 |
| | | | 717/172 |
| 2007/0011654 A1* | 1/2007 | Opperman | G06F 8/70 |
| | | | 717/122 |
| 2011/0125798 A1* | 5/2011 | Misch | G06F 8/71 |
| | | | 717/110 |
| 2020/0034282 A1* | 1/2020 | He | G06F 11/3684 |
| 2020/0201625 A1* | 6/2020 | Kryzhanovsky | G06F 8/71 |
| 2021/0141632 A1 | 5/2021 | Felisatti | |

OTHER PUBLICATIONS

Bunyakiati et al., "Cherry-Picking of Code Commits in Long-Running, Multi-release Software", ESEC/FSE'17, Sep. 4-8, 2017, Paderborn, Germany; pp. 1-5.
Jeswani, Kanchan, "Git Cherry-Pick", https://www.scaler.com/topics/git/git-cherry-pick/, Oct. 31, 2022; pp. 1-9.

* cited by examiner

*Primary Examiner* — Kostas J Katsikis
(74) *Attorney, Agent, or Firm* — Kilpatrick Townsend & Stockton LLP

(57) ABSTRACT

Certain users can be notified to manage collaboration for a software build. For example, a service can detect a copy of a file of a software build from an open-source environment being copied into a local repository of a first client device of a first user that is part of authorized users authorized to access the file. The first client device can apply a modification to the copy of the file to generate a modified copy of the file. In response to detecting the file, and prior to the first client device merging the modified copy of the file with the open-source environment, the service can identify a second user of the authorized users. The service can transmit, to a second client device of the second user, a storage notification indicating that the copy of the file has been stored on the first client device for applying the modification.

20 Claims, 3 Drawing Sheets

PATCH SHARING MECHANISM IN OPEN-SOURCE ENVIRONMENTS

TECHNICAL FIELD

The present disclosure relates generally to software development. More specifically, but not by way of limitation, this disclosure relates to a patch sharing mechanism in open-source environments.

BACKGROUND

More than one developer may work together, such as in an open-source environment, to create a software build that includes a set of executable code. Building software can include version control functions, code quality functions, and compilation functions. Version control is a component of software configuration management and involves managing changes to the software build. The developers may use a distributed version control system, such as Git, to coordinate workflow among the developers that are collaboratively developing source code for the software build. The distributed version control system enables each developer to access computer files for the software build and corresponding history of the computer files.

DETAILED DESCRIPTION

Figure 1:
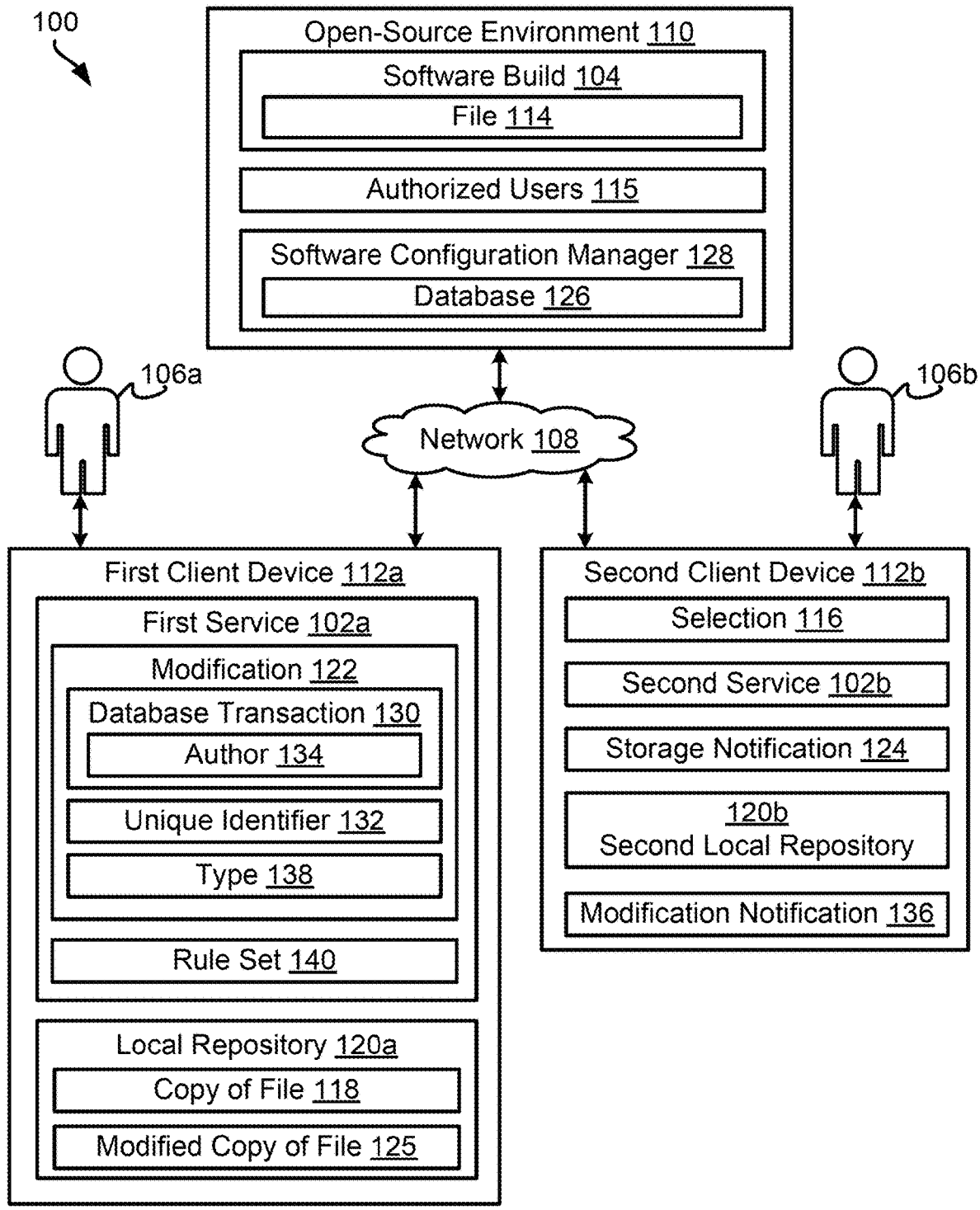
FIG. 1 is a block diagram of an example of a computing environment for a patch sharing mechanism in open-source environments according to one example of the present disclosure.

Software development processes can involve a developer drafting source code for a software build in an open-source environment. If the developer has an existing software build, the developer may initiate a software development process to improve the existing software build by developing a software patch for the software build. For example, if a vulnerability of the software build is detected, the developer may create a software patch to address the vulnerability of the software build. Certain software development processes may involve multiple developers working together to write the source code for the software build. But, each developer of the multiple developers may work on the source code by downloading source code files to a local system. Other developers may be unaware of modifications to the source code until the local source code, which may include modifications, is merged back into the open-source environment. As a result, a local modification to the source code created by one developer may overlap with another local modification from another developer. This may unnecessarily consuming computing resources used to develop the software build. In some instances, the other developer may be prevented from uploading the other local modification to the open-source environment, thereby wasting computing resources associated with applying the other local modification to the source code. Additionally or alternatively, attempting to merge the other local modification with the open-source environment may conflict with the local modification that has already been merged with the open-source environment.

Some examples of the present disclosure can overcome one or more of the issues mentioned above by using a patch sharing mechanism in open-source environments. Specifically, the patch sharing mechanism can detect that a first user has stored source code of a software build locally, such as in a local repository, and can notify other users associated with the software build. For example, a service such as a plugin, microservice, agent, or another suitable software add-on running on a client device for the user can detect and notify the other users. Once the copy of the files is stored in the local repository, the first user may use the client device to modify the copy of the files, for example by writing additional lines of code to add a new functionality to the source code. The service can notify the other users to indicate that the first user has copied the files of the source code to the local repository. This can indicate to the other users that modification of the file copied to the client device should be avoided until the updated copy of the files is merged by the first user. Once the copy of the files is merged to create an updated version of the file, the service may transmit another notification to the predetermined users to indicate that the file is accessible for modification. This can prevent multiple users from applying similar modifications to the files of the source code, thereby conserving computing resources that can be used for other computing processes. In some examples, the service may also prevent the other users from downloading and modifying the same files copied by the user until the user merges the copy of the files. This can prevent merge conflicts that may negatively impact the functioning of the software build or even cause the software build to fail.

In one particular example, a service installed on a client device can monitor a local repository for the client device. The service can be a plugin installed on the client device of each user associated with building a software patch hosted in an open-source environment. The users can modify the software patch by downloading files for the software patch to their respective client devices, modifying the files, and merging the modified files with the software patch. For example, a first user of a first client device can store a copy of a file of a software patch from the open-source environment to the local repository on the first client device. The software patch may be created to address a vulnerability of an existing software build hosted in the open-source environment.

Once the service detects that the file has been copied to the local repository, the service can identify a second user authorized to access the file of the software patch. For example, the second user may be another employee assigned to the software patch. The service may access a list of assigned users to identify the second user. The service then can transmit a storage notification to a second client device associated with the second user. The storage notification can indicate to the second user that file has been copied for modification by the first user. The second user may avoid modifying or attempting to modify the file until the first user merges the copy of the file with the open-source environment. In some examples, the service (e.g., a second version of the service executing on the second client device) can also prevent the second user from modifying the file. Specifically, after the second client device receives the storage notification, the second service can prevent the second client device from downloading a copy of the same file.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 for managing collaboration of a software build 104 in an open-source environment 110 according to one example of the present disclosure. The open-source environment 110 can be communicatively coupled to a first client device 112a and a second client device 112b via a network 108, such as a local area network (LAN), wide area network (WAN), the Internet, or any combination thereof.

Each client device 112a-b can include a respective service 102a-b to manage collaboration for the software build 104 by monitoring their respective client devices 112a-b. Each service 102 can be separate from each other and configured to interact with each other. Examples of the service 102 can include plugins, microservices, or agents. In some examples, the open-source environment 110 can be executed in a distributed computing environment (e.g., cloud computing systems, data grids, computing clusters, etc.). For example, the open-source environment may be executed on one or more nodes of the distributed computing environment, which may include the client devices 112a-b.

The open-source environment 110 can store the software build 104 that includes one or more files 114 containing code (e.g., source code, object code, or executable code). In some examples, the open-source environment 110 can include software development that is publicly accessible such that the software build 104 is collaboratively developed in a decentralized environment, relying on peer review and community production. To prevent malicious actors from altering the software build 104, an owner of the software build 104 may assign permissions to one or more authorized users 115 working together to develop the software build 104. The permissions can enable the authorized users 115 to access the software build 104 in the open-source environment 110. For example, the owner or another suitable administrator of the software build 104 can assign a role to each authorized user 115 in the open-source environment 110 that defines permissions available to each authorized user 115. Examples of the permissions can include read access, write access, admin access, or owner access. Based on the role assigned to a user 106 or a lack thereof, the open-source environment 110 may prevent an unauthorized user from interacting with (e.g., viewing, downloading, editing, reviewing, etc.) the software build 104.

The owner of the software build 104 can initiate the software build 104 to implement one or more functionalities. In some examples, an owner of an existing software build can initiate the software build 104 to include one or more additional functionalities, remove an existing functionality, or address a vulnerability of the existing software build. Examples of the vulnerability can include a bug, exploit, or unpatched program code. The software build 104 can have a single owner or multiple owners. In some examples, a first user 106a associated with the first client device 112a or a second user 106b associated with the second client device 112b may be an owner of the software build 104. Alternatively, the first user 106a and the second user 106b can work together with the owner of the software build 104 to develop the software build 104. The first user 106a can collaborate with the second user 106b to develop the software build 104, for example by having each user 106 work on a separate portion of the software build 104. As another example, the second user 106b may review a file 114 of the software build 104 created by the first user 106a and provide suggestions to modify the file 114. In some instances, the first user 106a may be able to reject a suggestion provided by the second user 106b.

As part of developing the software build 104, the first user 106a may use the first client device 112a to select the file 114 to copy the file 114 locally. For example, after selecting the file 114, the first client device 112a can copy the file 114 such that a copy 118 of the file 114 is stored in a local repository 120a of the first client device 112a. The first user 106a can then use the first client device 112a to apply a modification 122 to the copy 118 of the file 114. Examples of the modification 122 can include adding a comment, adding one or more lines of code, or fixing a typographical error.

The first service 102a in the first client device 112a can monitor the local repository 120a and can detect the copy 118 of the file 114 downloaded from the open-source environment 110. Based on the detection, the first service 102a can transmit a storage notification 124 to other client devices associated with other predetermined users that are authorized to modify the software build 104. In some examples, the first service 102a may access a data object (e.g., a list, table, etc.) that contains the authorized users 115 associated with the software build 104. For example, the first service 102a can access a list of the authorized users 115 of the software build 104 to transmit the storage notification 124 to the second client device 112b of the second user 106b. Accordingly, the first service 102a may identify the second user 106b associated with the second client device 112b as a predetermined user that should be notified of the copy 118 of the file 114 stored by the first client device 112a. Additionally or alternatively, the predetermined users may use a respective client device communicatively coupled to the open-source environment 110 to generate a request to be notified about the software build 104. Based on the request, the predetermined users may be added to a list of users that are notified when the copy 118 of the file 114 has been stored in a client device 112 (e.g., the first client device 112a or the second client device 112b). In some examples, the predetermined users may only have view permissions to interact with the software build 104 without applying a modification 122 to the file 114. In such examples, the predetermined users can be added to the list of users to receive updates with respect to changes to the file 114 via notifications, such as the storage notification 124 that is transmitted when the copy 118 of the file 114 is stored by the first client device 112a.

The first service 102a can therefore transmit a storage notification 124 to the second client device 112b, indicating that the copy 118 of the file 114 is stored in the first client device 112a. A second service 102b in the second client device 112b may receive the storage notification 124 from the first service 102a and can then notify the second user 106b, for example using a pop-up notification or an audible notification. In some examples, prior to the first client device 112a copying the file 114 to the local repository 120a, the second user 106b may use the second client device 112b to copy the file 114 to the second local repository 120b. In such examples, the second service 102b in the second client device 112b can transmit the storage notification 124 to the first client device 112a.

The first service 102a may transmit additional notifications to the second client device 112b. For example, the first client device 112a can apply the modification 122 to the copy 118 of the file 114 to generate a modified copy 125 of the file 114. The first service 102a can detect the modification 122 applied by the first client device 112a to the copy 118 of the file 114 by monitoring a database 126 of a software configuration manager 128 (e.g., Gerrit, GitHub, GitLab, etc.) in the open-source environment 110. For example, the first service 102a can be part of an integrated development environment (IDE) in communication with the software configuration manager 128 to monitor the database 126 of the software configuration manager 128. The software configuration manager 128 can be used to track and control changes to the software build 104, for example by managing different versions of files in the software build 104.

The software configuration manager 128 can log each modification 122 to the software build 104 in the database 126 as a database transaction 130. The database transaction 130 can be tagged with a unique identifier 132 used to locate the database transaction 130 in the database 126. In some examples, the authorized users 115 can be identified by querying the database 126 to identify an author 134 of each database transaction 130 associated with modifying the software build 104. For example, the software configuration manager 128 may log a database transaction 130 as a text-based file in the database 126, the text-based file including a field identifying the author 134 of the database transaction 130.

In some examples, once the first service 102a detects the modification 122 applied to the copy 118 of the file 114, the first service 102a may transmit a modification notification 136 to the second client device 112b. The first service 102a can transmit the modification notification 136 prior to the first client device 112a merging the modified copy 125 of the file 114 with the open-source environment 110. Based on this modification notification 136, the second client device 112b can notify the second user 106b with respect to the modification 122 to the copy 118 of the file 114. As a result, the second user 106b can be aware of the modification 122 to the copy 118 of the file 114 and may avoid copying the file 114 before the modified copy 125 of the file 114 is merged such that a single copy 118 of the file 114 is modified at a time. For example, the modification notification 136 may include metadata that identifies the file 114 that was copied to create the copy 118 of the file 114. The metadata additionally may identify the modification 122 applied by the first client device 112a to the copy 118 of the file 114.

Additionally, the first service 102a may determine whether to transmit the modification notification 136 based on a type 138 of the modification 122. The type 138 of the modification 122 can be based on a degree to which the copy 118 of the file 114 is modified. For example, the first service 102a may determine a rating or score for the modification 122. In some examples, the type 138 of the modification 122 may categorize the modification 122 as a relatively minor modification (e.g., having a relatively low score that is below a predefined threshold) or as a relatively major modification (e.g., having a relatively high score that is above the predefined threshold). The first service 102a may transmit the modification notification 136 if the modification 122 is a relatively major modification. Alternatively, if the modification 122 is a relatively minor modification, the first service 102a may avoid transmitting the modification notification 136 to the second client device 112b.

For example, if the modification 122 involves adding a comment, the modification 122 may be considered a relatively minor modification. Other examples of a relatively minor modification can include changing a variable name or adjusting line spacing to improve readability. If the modification 122 involves adding multiple lines of code to implement an additional functionality, the modification 122 may be considered a relatively major modification, causing the first service 102a to transmit the modification notification 136. Another example of a relatively major modification can include a substantive change, such as removing one or more lines of code to remove an existing functionality.

The first service 102a can apply a rule set 140 to determine the type 138 of the modification 122. For example, the first service 102a can select the rule set 140 from one or more rule sets stored in a rule database that may be local to or remote from the first client device 112a. The first service 102a can select the rule set 140 based on the modification 122 to the file 114, the file 114, or a combination thereof. In some examples, the first service 102a may first identify a programming language of the file 114 prior to selecting the rule set 140 such that the selected rule set 140 corresponds to the programming language of the file 114. For example, the first service 102a may implement a rule set 140 that indicates whether the modification 122 is a comment based on the programming language of the file 114. As an illustrative example, if the programming language is Python, a hashtag symbol can denote a start of a comment. Accordingly, the rule set 140 may involve searching the modification 122 or the modified copy 125 of the file 114 to determine whether the hashtag symbol is present, enabling the first service 102a to then determine the type 138 of the modification 122. The first service 102a can use a file extension (e.g., .py, .cpp, .c, etc.) of the file 114 to identify the programming language of the file 114.

In some examples, the second service 102b may prevent the second client device 112b from downloading a copy 118 of the file 114 after receiving the storage notification 124. The second user 106b may make a selection 116 using the second client device 112b to copy the file 114 to another local repository (e.g., a second local repository 120b) of the second client device 112b. The second service 102b can detect this selection 116 and that the first client device 112a has not merged the modified copy 125 of the file 114 with the open-source environment 110. Subsequently, the second service 102b can prevent the second client device 112b from copying the file 114 to the second local repository 120b prior to detecting that the first client device 112a has merged the modified copy 125 of the file 114.

The second service 102b can determine that the first client device 112a has merged the modified copy 125 of the file 114 with the open-source environment 110, for example through communication with the first service 102a. Once the first service 102a detects that the first client device 112a has merged the modified copy 125 of the file 114 with the open-source environment 110, the second service 102b can enable the second client device 112b to copy the file 114 locally. Merging the modified copy 125 of the file 114 with the open-source environment 110 can cause the open-source environment 110 to generate an updated version of the file 114 including the modification 122 to the file 114. In some examples, the first service 102a may transmit a different notification to the second client device 112b to notify the second user 106b when the second user 106b can copy the file 114 to the second local repository 120b. By managing permissions with respect to copying the file 114, the first service 102a can prevent duplicate modifications to the file 114, thereby conserving computing resources (e.g., storage resources, RAM, etc.).

While FIG. 1 depicts a specific arrangement of components, other examples can include more components, fewer components, different components, or a different arrangement of the components shown in FIG. 1. For instance, in other examples, more than two users 106 may collaborate to develop the software build 104. Thus, the computing environment 100 may include more than two client devices 112. Additionally, any component or combination of components depicted in FIG. 1 can be used to implement the process(es) described herein.

Figure 2:
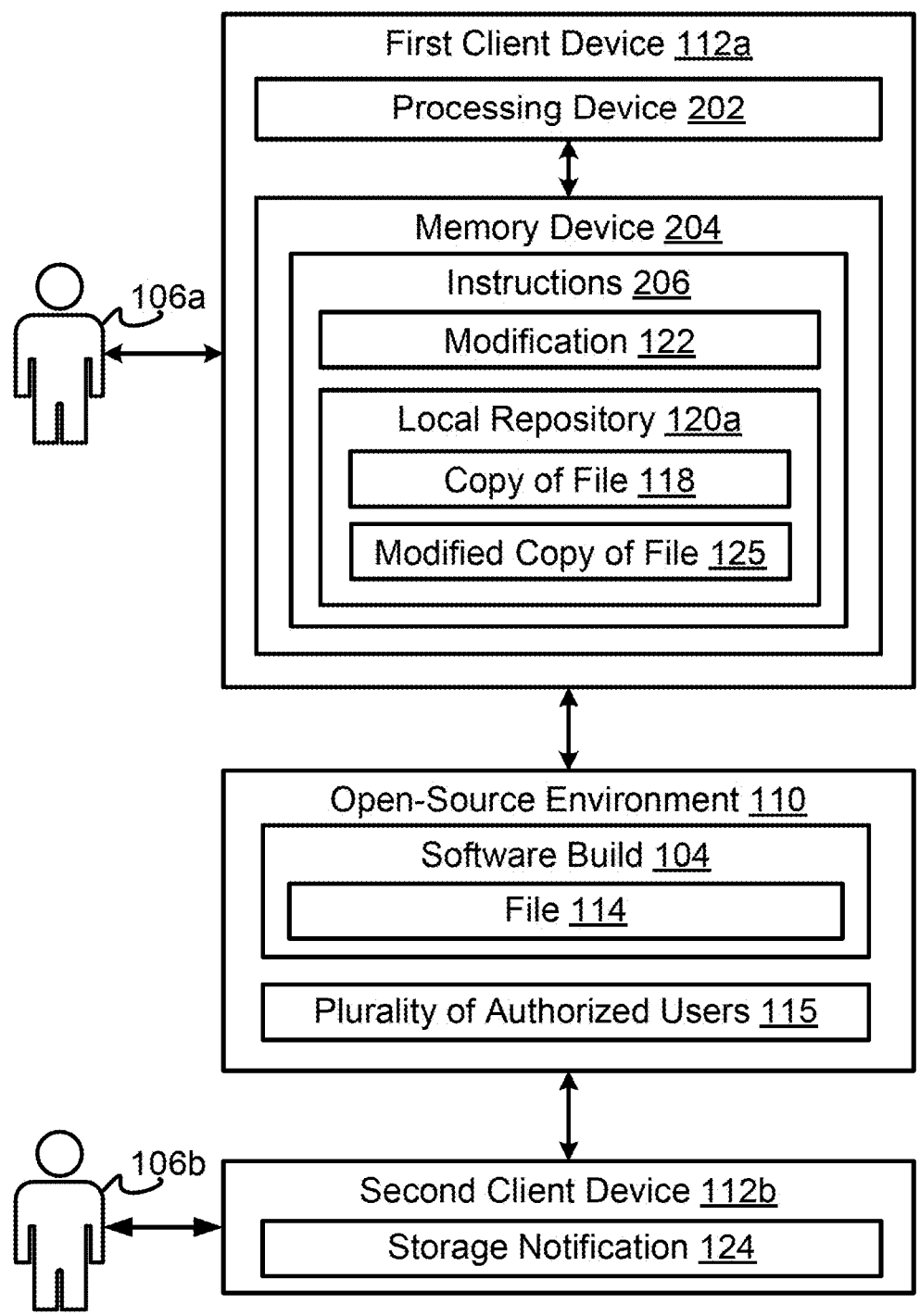
FIG. 2 is a block diagram of another example of a computing environment for a patch sharing mechanism in open-source environments according to one example of the present disclosure.

FIG. 2 is a block diagram of another example of a computing environment 200 for managing collaboration for a software build in an open-source environment 110 according to one example of the present disclosure. The computing environment 200 can include a processing device 202 communicatively coupled to a memory device 204. Additionally, the processing device 202 and the memory device 204 can be part of a first client device 112a communicatively coupled to an open-source environment 110 hosting the software build 104.

The processing device 202 can include one processing device or multiple processing devices. The processing device 202 can be referred to as a processor. Non-limiting examples of the processing device 202 include a Field-Programmable Gate Array (FPGA), an application-specific integrated circuit (ASIC), and a microprocessor. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C #, Java, Python, or any combination of these.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. At least some of the memory device 204 includes a non-transitory computer-readable medium from which the processing device 202 can read instructions 206. A computer-readable medium can include electronic, optical, magnetic, or other storage devices capable of providing the processing device 202 with the instructions 206 or other program code. Non-limiting examples of a computer-readable medium include magnetic disk(s), memory chip(s), ROM, random-access memory (RAM), an ASIC, a configured processor, and optical storage.

In some examples, the processing device 202 can detect that a copy 118 of a file 114 of the software build 104 is being copied into a local repository 120 of a first client device 112a associated with a first user 106a. The first client device 112a can be used by the first user 106a to apply a modification 122 to the copy 118 of the file 114 stored in the local repository 120 to generate a modified copy 125 of the file 114. The first user 106a can be part of a plurality of authorized users 115 authorized to access the file 114 in an open-source environment 110. Authorization to access the file 114 can involve permissions to copy, edit, move, or otherwise interact with the file 114. Additionally, the processing device 202 can determine that a second user 106b is part of the plurality of authorized users 115.

To prevent duplicate work from the second user 106b authorized to access the file 114, the processing device 202 can notify the second user 106b that the file 114 has been copied to the first client device 112a. Specifically, the processing device 202 can transmit a storage notification 124 to the second client device 112b associated with the second user 106b. In some examples, the processing device 202 may transmit a modification notification 136 to the second client device 112b once the processing device 202 detects a modification 122 applied to the copy 118 of the file 114 by the first client device 112a. The processing device 202 can use a rule set 140 to determine whether to transmit the modification notification 136 to the second client device 112b, for example by identifying a type 138 of the modification 122 to the copy 118 of the file 114.

Figure 3:
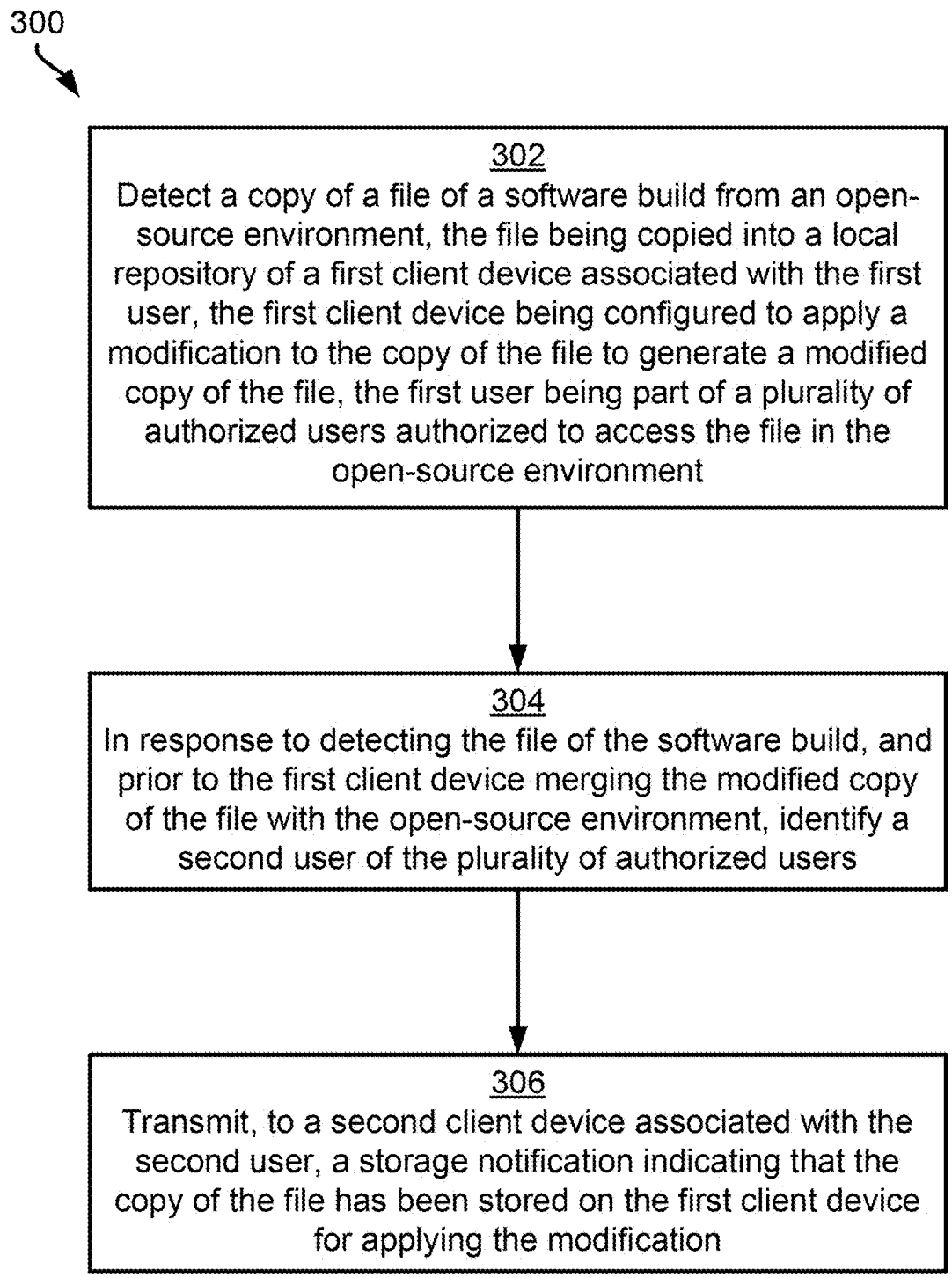
FIG. 3 is a flowchart of a process for a patch sharing mechanism in open-source environments according to one example of the present disclosure.

FIG. 3 is a flowchart of a process 300 for managing collaboration for a software build in an open-source environment 110 according to one example of the present disclosure. In some examples, the processing device 202 can perform one or more of the steps shown in FIG. 3. In other examples, the processing device 202 can implement more steps, fewer steps, different steps, or a different order of the steps depicted in FIG. 3. The steps of FIG. 3 are described below with reference to components discussed above in FIGS. 1-2.

In block 302, the processing device 202 detects a copy 118 of a file 114 of a software build 104 from an open-source environment 110 being copied into a local repository 120a of a first client device 112a associated with the first user 106a. The first client device 112a can be configured to apply a modification 122 to the copy 118 of the file 114 to generate a modified copy 125 of the file 114. For example, the open-source environment 110 may use a Git-based software configuration manager (e.g., Github or Gerrit) as a software configuration manager 128 associated with the open-source environment 110. In such examples, the first client device 112a can be used to cherry-pick the file 114 such that a copy 118 of the file 114 is stored in the local repository 120a of the first client device 112a. The modification 122 then can be applied to the copy 118 of the file 114, for example to include an additional functionality.

The first user 106a can be part of a plurality of authorized users 115 authorized to access the file 114. The processing device 202 may query a database 126 of the software configuration manager 128 to identify the authorized users 115 based on a database transaction 130 associated with modifying the software build 104. Specifically, the processing device 202 can identify an author 134 of the database transaction 130 that is authorized to modify the software build 104, thereby being authorized to access the file 114.

In block 304, in response to detecting the file 114 of the software build 104, and prior to the first client device 112a merging the modified copy 125 of the file 114 with the open-source environment 110, the processing device 202 identifies a second user 106b of the plurality of authorized users 115. The processing device 202 may identify the second user 106b by accessing a data object, such as a table, that stores a list of the plurality of authorized users 115. Additionally or alternatively, the processing device 202 can identify permissions (e.g., access permission, edit permission, etc.) assigned to the second user 106b to determine whether the second user 106b is part of the authorized users 115. For example, the second user 106b may be assigned a role as a reviewer for the file 114 such that the second user 106b is authorized to access to file 114 to provide feedback (e.g., comments, potential modifications, etc.) with respect to the file 114.

In block 306, the processing device 202 transmits, to a second client device 112b associated with the second user 106b, a storage notification 124 indicating that the copy 118 of the file 114 has been stored on the first client device 112*a* for applying the modification 122. Once the second client device 112*b* receives the storage notification 124, the second user 106*b* may avoid modifying the software build 104 until the first client device 112*a* merges the modified copy 125 of the file 114. In some examples, a second service 102*b* monitoring the second client device 112*b* may prevent the second user 106*b* from modifying the software build 104 until the first client device 112*a* merges the modified copy 125 of the file 114. The processing device 202 may notify the second user 106*b* by transmitting another notification to the second client device 112*b* once the modified copy 125 of the file 114 has been merged with the open-source environment 110. Once the second client device 112*b* receives this other notification, the second user 106*b* may be enabled to copy the file 114 locally and apply additional modifications to the copy 118 of the file 114.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device of a first client device associated with a first user; and
a memory device of the first client device, the memory device including instructions for a service, the service being executable by the processing device for causing the processing device to perform operations comprising:
detecting a copy of a file of a software build from a collaborative development environment, the file being copied into a local repository of the first client device, the first client device being configured to apply a modification to the copy of the file to generate a modified copy of the file, the first user being part of a plurality of authorized users authorized to access the file in the collaborative development environment;
in response to detecting the copy of the file of the software build in the local repository, and prior to the first client device merging the modified copy of the file with the collaborative development environment:
identifying a second user of the plurality of authorized users; and
transmitting, to a second client device associated with the second user, a storage notification indicating that the copy of the file has been stored on the first client device for applying the modification, the second client device being configured to receive the storage notification and responsively perform an operation to prevent the file from being copied to the second client device.

2. The system of claim 1, wherein the local repository is a first local repository, and wherein the second client device is configured to:
detect that the first client device has not merged the modified copy of the file with the collaborative development environment; and
in response to determining that the first client device has not merged the modified copy of the file with the collaborative development environment, prevent the second client device from copying the file to a second local repository associated with the second client device.

3. The system of claim 2, wherein the
second client device is further configured to:
detect that the first client device has merged the modified copy of the file with the collaborative development environment; and
subsequent to detecting that the first client device has merged the modified copy of the file to the collaborative development environment, enable the second client device to copy the file to the second local repository.

4. The system of claim 1, wherein the operations further comprise:
detecting the modification applied by the first client device to the copy of the file; and
transmitting a modification notification to the second client device, wherein the second client device is configured to receive the modification notification and to notify the second user with respect to the modification to the copy of the file.

5. The system of claim 4, wherein the operations further comprise, in response to detecting the modification applied by the first client device to the copy of the file:
identifying a type of the modification based on a rule set, wherein the modification notification is transmitted based on the type of the modification.

6. The system of claim 4, wherein detecting the modification applied by the first client device to the copy of the file further comprises:
monitoring a database of a software configuration manager in the collaborative development environment by detecting a unique identifier of a database transaction associated with the modification applied by the first client device to the copy of the file, wherein the software configuration manager is configured to log each database transaction associated with modifying the software build in the database.

7. The system of claim 6, wherein identifying the plurality of authorized users comprises:
querying the database of the software configuration manager to identify an author of each database transaction associated with modifying the software build, wherein the author of each database transaction is part of the plurality of authorized users.

8. The system of claim 1, wherein the operation performed by the second client device involves outputting a visual or audible notification to the second user.

9. A method comprising:
detecting, by a first client device associated with a first user, a copy of a file of a software build from a collaborative development environment, the file being copied into a local repository of the first client device, the first client device being configured to apply a modification to the copy of the file to generate a modified copy of the file, the first user being part of a plurality of authorized users authorized to access the file in the collaborative development environment;
in response to detecting the copy of the file of the software build, and prior to the first client device merging the modified copy of the file with the collaborative development environment:
identifying, by the first client device, a second user of the plurality of authorized users; and
transmitting, by the first client device and to a second client device associated with the second user, a storage notification indicating that the copy of the file has been stored on the first client device for applying the modification, the second client device being configured to receive the storage notification and responsively perform an operation to prevent the file from being copied to the second client device.

10. The method of claim 9, wherein the local repository is a first local repository, and wherein the second client device is further configured to:
   detect a selection by the second user to copy the file to a second local repository of the second client device;
   detect that the first client device has not merged the modified copy of the file with the collaborative development environment; and
   in response to determining that the first client device has not merged the modified copy of the file with the collaborative development environment, prevent the second client device from copying the file to the second local repository associated with the second client device.

11. The method of claim 10, wherein the second client device is configured to:
   detect that the first client device has merged the modified copy of the file with the collaborative development environment; and
   subsequent to detecting that the first client device has merged the modified copy of the file to the collaborative development environment, enable the second client device to copy the file to the second local repository.

12. The method of claim 9, further comprising:
   detecting the modification applied by the first client device to the copy of the file; and
   transmitting a modification notification to the second client device, wherein the second client device is configured to receive the modification notification and notify the second user with respect to the modification to the copy of the file.

13. The method of claim 12, wherein detecting the modification applied by the first client device to the copy of the file further comprises:
   monitoring a database of a software configuration manager in the collaborative development environment by detecting a unique identifier of a database transaction associated with the modification applied by the first client device to the copy of the file, wherein the software configuration manager is configured to log each database transaction associated with modifying the software build in the database.

14. The method of claim 13, wherein identifying the plurality of authorized users comprises:
   querying the database of the software configuration manager to identify an author of each database transaction associated with modifying the software build, wherein the author of each database transaction is part of the plurality of authorized users.

15. The method of claim 12, further comprising, in response to detecting the modification applied by the first client device to the copy of the file:
   identifying a type of the modification based on a rule set, wherein the modification notification is transmitted based on the type of the modification.

16. A non-transitory computer-readable medium comprising program code executable by a processing device for causing the processing device to perform operations comprising:
   detecting a copy of a file of a software build from a collaborative development environment, the file being copied into a local repository of a first client device associated with a first user, the first client device being configured to apply a modification to the copy of the file to generate a modified copy of the file, the first user being part of a plurality of authorized users authorized to access the file in the collaborative development environment;
   in response to detecting the copy of the file of the software build, and prior to the first client device merging the modified copy of the file with the open-source-collaborative development environment:
      identifying a second user of the plurality of authorized users; and
      transmitting, to a second client device associated with the second user, a storage notification indicating that the copy of the file has been stored on the first client device for applying the modification, the second client device being configured to receive the storage notification and responsively perform an operation to prevent the file from being copied to the second client device.

17. The non-transitory computer-readable medium of claim 16, wherein the local repository is a first local repository, and wherein the second client device is further configured to:
   detect a selection by the second user to copy the file to a second local repository of the second client device;
   detect that the first client device has not merged the modified copy of the file with the collaborative development environment; and
   in response to determining that the first client device has not merged the modified copy of the file with the collaborative development environment, prevent the second client device from copying the file to the second local repository associated with the second client device.

18. The non-transitory computer-readable medium of claim 17, wherein the second client device is further configured to:
   detect that the first client device has merged the modified copy of the file with the collaborative development environment; and
   subsequent to detecting that the first client device has merged the modified copy of the file to the collaborative development environment, enable the second client device to copy the file to the second local repository.

19. The non-transitory computer-readable medium of claim 16, wherein the operations further comprise:
   detecting the modification applied by the first client device to the copy of the file; and
   transmitting a modification notification to the second client device, wherein the second client device is configured to receive the modification notification and notify the second user with respect to the modification to the copy of the file.

20. The non-transitory computer-readable medium of claim 19, wherein the operations further comprise, in response to detecting the modification applied by the first client device to the copy of the file:
   identifying a type of the modification based on a rule set, wherein the modification notification is transmitted based on the type of the modification.

* * * * *